(12) United States Patent (10) Patent No.: US 12,076,814 B2
Roychowdhury et al. (45) Date of Patent: Sep. 3, 2024

(54) SYSTEMS AND METHODS FOR FABRICATING A COMPONENT WITH A SIMULATED LASER ARRAY

(71) Applicant: General Electric Company, Schenectady, NY (US)

(72) Inventors: Subhrajit Roychowdhury, Schenectady, NY (US); James William Sears, Niskayuna, NY (US); Harry Kirk Mathews, Jr., Clifton Park, NY (US)

(73) Assignee: General Electric Company, Cincinnati, OH (US)

( * ) Notice: Subject to any disclaimer, the term of this patent is extended or adjusted under 35 U.S.C. 154(b) by 244 days.

(21) Appl. No.: 15/615,163

(22) Filed: Jun. 6, 2017

(65) Prior Publication Data

US 2018/0345382 A1 Dec. 6, 2018

(51) Int. Cl.
| | | |
|---|---|---|
| *B23K 26/067* | (2006.01) | |
| *B22F 7/06* | (2006.01) | |
| *B22F 10/28* | (2021.01) | |
| *B22F 10/366* | (2021.01) | |
| *B22F 12/00* | (2021.01) | |
| *B22F 12/44* | (2021.01) | |
| *B22F 12/49* | (2021.01) | |
| *B23K 26/342* | (2014.01) | |
| *B33Y 10/00* | (2015.01) | |
| *B33Y 30/00* | (2015.01) | |

(52) U.S. Cl.
CPC .......... *B23K 26/0676* (2013.01); *B22F 7/064* (2013.01); *B22F 10/28* (2021.01); *B22F 12/44* (2021.01); *B22F 12/49* (2021.01); *B23K 26/342* (2015.10); *B33Y 10/00* (2014.12); *B33Y 30/00* (2014.12); *B22F 10/366* (2021.01); *B22F 12/38* (2021.01)

(58) Field of Classification Search
CPC ..... B29C 64/268; B29C 64/153; G11B 7/125; B23K 26/342; B23K 26/0676; B33Y 10/00; B33Y 30/00; G02B 26/001; G02B 26/002; G02B 26/004; G02B 26/007; G02B 26/02; G02B 26/06; G02F 1/01; G02F 1/03; G02F 1/165; G02F 1/166; G02F 1/1673; G02F 1/169; G02F 1/35; G02F 3/00
USPC .................................................. 359/237–324
See application file for complete search history.

(56) References Cited

U.S. PATENT DOCUMENTS

| | | |
|---|---|---|
| 5,753,171 A | 5/1998 | Serbin et al. |
| 5,840,239 A | 11/1998 | Partanen et al. |
| 8,374,206 B2 | 2/2013 | Peng et al. |
| 2009/0002716 A1* | 1/2009 | Nolte ................. G01N 21/4788 356/511 |
| 2015/0076739 A1 | 3/2015 | Batchelder |

(Continued)

FOREIGN PATENT DOCUMENTS

| | | |
|---|---|---|
| CN | 104669804 A | 6/2015 |
| DE | 102004022386 B4 | 5/2006 |

*Primary Examiner* — S. Behrooz Ghorishi
(74) *Attorney, Agent, or Firm* — Dority & Manning, P.A.

(57) ABSTRACT

A powder melting device for an additive manufacturing system including a laser device configured to emit an energy beam and a beam modulator. The beam modulator is configured to selectively induce an angular deflection in the energy beam for a predetermined time period such that the energy beam generates a plurality of melt pools in a powder bed.

15 Claims, 5 Drawing Sheets

(56) References Cited

U.S. PATENT DOCUMENTS

2016/0158886 A1 6/2016 Kumar et al.
2017/0165792 A1* 6/2017 Buller .................. B29C 64/307

* cited by examiner

SYSTEMS AND METHODS FOR FABRICATING A COMPONENT WITH A SIMULATED LASER ARRAY

BACKGROUND

The subject matter disclosed herein relates generally to additive manufacturing systems and, more particularly, to methods and systems for fabricating a component using a simulated laser array by inducing a plurality of angular deflections in an energy beam generated by a laser device.

At least some additive manufacturing systems involve the buildup of a particulate material to make a component. Such techniques facilitate producing complex components from expensive materials at a reduced cost and with improved manufacturing efficiency. At least some known additive manufacturing systems, such as Direct Metal Laser Melting (DMLM), Selective Laser Sintering (SLS), Direct Metal Laser Sintering (DMLS), and LaserCusing® systems fabricate components using a focused energy source, such as a laser device or an electron beam generator, a build platform, and a particulate, such as, without limitation, a powdered metal. (LaserCusing is a registered trademark of Concept Laser GmbH of Lichtenfels, Germany.) The focused energy source device melts the particulate material on the build platform in and around the area where the focused energy source is incident on the particulate material, resulting in at least one melt pool. Each melt pool cools and forms at least a portion of the next layer in the build process.

In at least some DMLM systems, the laser beam or electron beam is used to scan a layer of powder to sinter and melt the desired pattern in the layers of the powder bed. The typical scanning time for such systems per layer is in the range of 70-100 seconds. For certain parts, the build time requires days of processing time. The time required to scan a component per layer prevents significant cost benefits associated with additive manufacturing from being fully realized. Additionally, component quality of DMLM systems may be reduced due to non-uniform powder melting caused by vaporization and/or Rayleigh instability of the powder if energy density and/or velocity constraints of the powder are exceeded by the laser.

BRIEF DESCRIPTION

In one aspect, a powder melting device for an additive manufacturing system is provided. The powder melting device includes a laser device configured to emit an energy beam and a beam modulator. The beam modulator is configured to selectively induce an angular deflection in the energy beam for a predetermined time period such that the energy beam generates a plurality of melt pools in a powder bed.

In another aspect, an additive manufacturing system is provided. The additive manufacturing system includes a powder bed and a powder melting device. The powder melting device includes a laser device configured to emit an energy beam and a beam modulator. The beam modulator is configured to induce an angular deflection in the energy beam for a predetermined time period such that the energy beam generates a plurality of melt pools in a powder bed.

In yet another aspect, a method of fabricating a component in a powder bed is provided. The method includes emitting an energy beam from a laser device. The method further includes inducing at least one angular deflection in the energy beam for a predetermined time period using a beam modulator and generating a plurality of melt pools with the deflected energy beam.

DRAWINGS

These and other features, aspects, and advantages of the present disclosure will become better understood when the following detailed description is read with reference to the accompanying drawings in which like characters represent like parts throughout the drawings, wherein.

Figure 1:
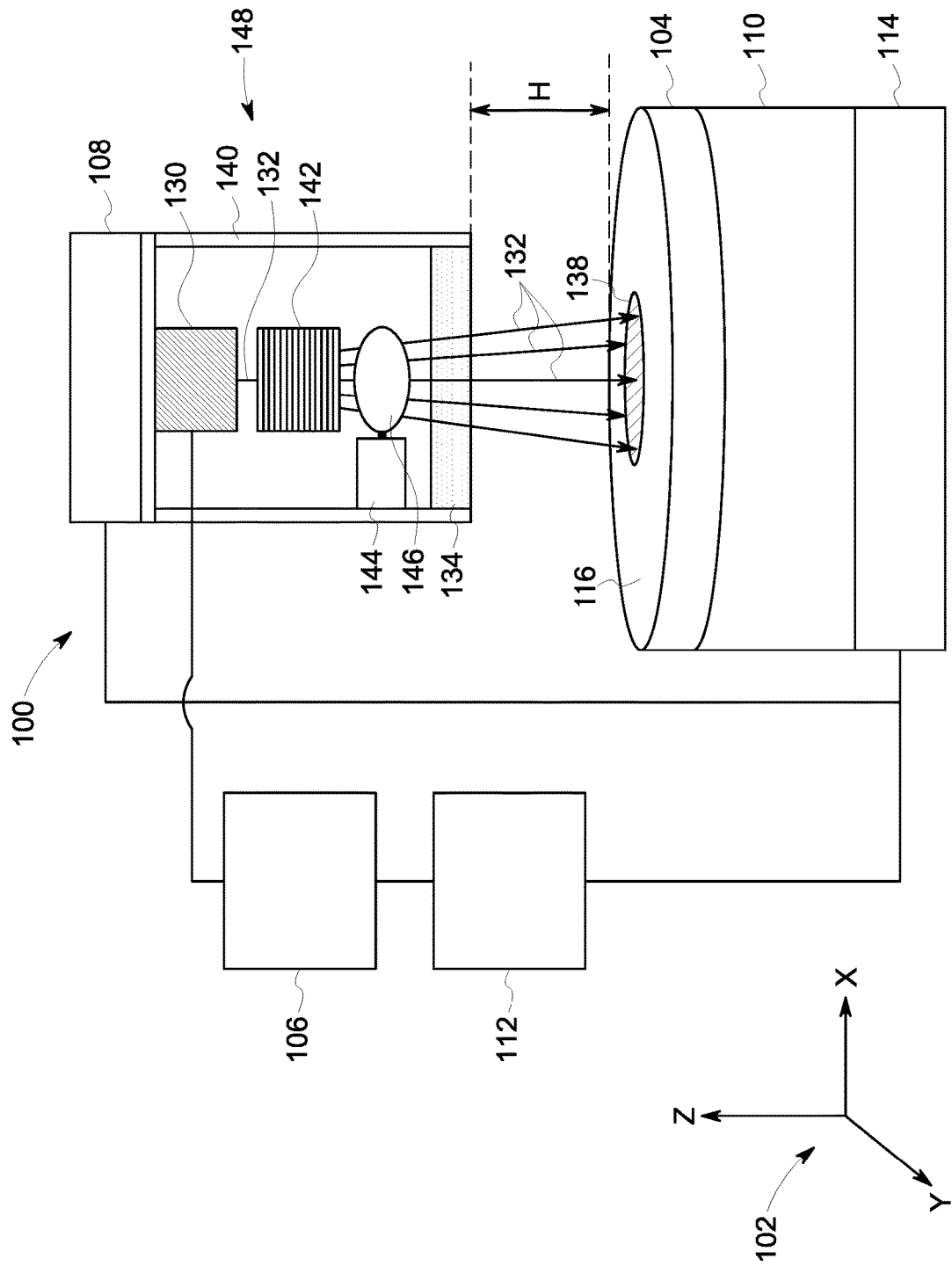
FIG. 1 is a schematic view of an exemplary additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the terms "processor" and "computer" and related terms, e.g., "processing device," "computing device," and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein facilitate manipulation of an energy beam generated by a laser to simulate the behavior of an array of lasers generating a plurality of energy beams. The energy beam is manipulated to generate a desired beam spot pattern and corresponding power density across the beam spot pattern to generate a melt pool in a powdered material. Accordingly, systems and methods described herein facilitate consistent and predictable manufacturing of large areas using a single laser in place of multiple lasers during additive manufacturing processes. Specifically, an additive manufacturing system includes at least one laser device and at least one beam modulator configured to induce a predetermined angular deflection in the energy beam generated by the laser device for a predetermined time period. In additive manufacturing systems, moving the energy beam from a laser device more rapidly across the powder bed in order to decrease scan time, or using a higher power laser device to deliver more energy to account for a more rapid scan speed is not always practical due to various limitations imposed by the components of the additive manufacturing system and the fundamental physics of the interactions between the energy beam and the powdered material. To address these shortcomings, the beam modulator generates a beam spot pattern by cycling through the predetermined angular deflections at predetermined time periods, the beam spot patterns including, without limitation, a linear beam spot pattern or a two-dimensional beam spot array. The predetermined time periods generally facilitate creation of a melt pool associated with each beam spot, but are of sufficiently short duration to facilitate the beam modulator cycling through each predetermined angular deflection prior to exceeding a melting time constant of the powdered material. Such switching behavior by the beam modulator can be used to, without limitation, increase the total power applied to a component surface without leading to vaporization, spatter, and degradation of mechanical and microstructural properties of the resulting component due to Rayleigh instability effects.

In the exemplary embodiment, for example, inducing the predetermined angular deflection includes inducing engineered beam deflections that include, e.g., and without limitation, an angular deflection in the energy beam such that a beam spot is produced on the face of the component in a location that does not lie on the axis defining the energy beam as it is received by the beam modulator. As described in more detail below, predetermined angular deflections may be selectively induced in the energy beam to facilitate generation of various simulated arrays having spot patterns having different characteristics. In certain embodiments, the time interval for each predetermined angular deflection varies to facilitate inducing a non-uniform power distribution within the beam spot pattern during operation of the additive manufacturing system.

FIG. 1 is a schematic view of an exemplary additive manufacturing system 100. A coordinate system 102 includes an x-axis, a y-axis, and a z-axis. In the exemplary embodiment, additive manufacturing system 100 includes a powder melting device 148 including a laser device 130, a beam modulator 142, a scanning motor 144, and a scanning mirror 146 for fabricating a component 104 using a layer-by-layer manufacturing process. Laser device 130 provides a high-intensity heat source configured to generate a melt pool 138 (not shown to scale) in a powdered material, i.e., in a powder bed 110, using an energy beam 132. Beam modulator 142 induces angular deflections in energy beam 132. Scanning motor 144 is configured to move scanning mirror 146 to scan energy beam 132 to pass through a scanning lens 134 and across powder bed 110. Laser device 130 is contained within a housing 140 that is coupled to a mounting system 108. Additive manufacturing system 100 also includes a computer control system, or controller 106. Mounting system 108 is moved by an actuator or an actuator system 112 that is configured to move mounting system 108 in an XY plane to cooperate with scanning mirror 146 to facilitate fabricating a layer of component 104 within additive manufacturing system 100. For example, and without limitation, mounting system 108 may be pivoted about a central point, moved in a linear path, a curved path, and/or rotated to cover a circular portion of the powder on powder bed 110 to facilitate directing energy beam 132 along the surface of component 104. Alternatively, housing 140 and energy beam 132 are moved in any orientation and manner that enables additive manufacturing system 100 to function as described herein.

Scanning motor 144 is controlled by controller 106 and moves mirror 146 such that energy beam 132 is reflected to be incident along a predetermined path about a powder bed 110, such as, for example, and without limitation, linear and/or rotational paths. In the exemplary embodiment, the combination of scanning motor 144 and scanning mirror 146 is a two-dimension scan galvanometer. Alternatively, scanning motor 144 and scanning mirror 146 comprise a three-dimension (3D) scan galvanometer, dynamic focusing galvanometer, and/or any other scanning method that may be used to deflect energy beam 132 of laser device 130.

In the exemplary embodiment, a powder bed 110 is mounted to a support structure 114, which is moved by actuator system 112. As described above with respect to mounting system 108, actuator system 112 is also configured to move support structure 114 in a Z direction (i.e., a direction normal to a top surface of powder bed 110). In some embodiments, actuator system 112 is also configured to move support structure 114 in the XY plane. For example, and without limitation, in an alternative embodiment where housing 140 is stationary, actuator system 112 moves support structure 114 in the XY plane to cooperate with scanning motor 144 and scanning mirror 146 to direct energy beam 132 of laser device 130 along a predetermined path through powder bed 110. In the exemplary embodiment, actuator system 112 includes, for example, and without limitation, a linear motor(s), a hydraulic and/or pneumatic piston(s), a screw drive mechanism(s), and/or a conveyor system.

In the exemplary embodiment, beam modulator 142 is disposed between laser device 130 and component 104. Beam modulator 142 is generally configured to receive energy beam 132 and to induce a predetermined angular deflection in least one energy beam 132 for a predetermined time period to form a deflected energy beam 132. In the exemplary embodiment, beam modulator 142 is an acousto-optic modulator. Alternatively, beam modulator 142 may be an electro-optic modulator, and/or a spatial light modulator. Further, in the exemplary embodiment, beam modulator 142 is configured to induce a plurality of predetermined angular deflections in energy beam 132, each deflection of energy beam 132 having a predetermined time period of deflection.

For the purposes of this disclosure, the term "angular deflection" generally refers to a change in direction of an energy beam 132 after passing through beam modulator 142 that may be quantified by a resulting angle of energy beam 132 relative to the axis defining the original incoming direction of energy beam 132. In the exemplary embodiment, the change in direction of energy beam 132 is achieved by shifting the frequency of the light waves of energy beam 132 using sound waves, which results in, without limitation, at least a deflection of energy beam 132 as it passes through beam modulator 142. More particularly, in the exemplary embodiment, acousto-optic beam modulator 142 uses a piezoelectric transducer driven by an oscillating electric signal to vibrate and create sound waves in a translucent material, i.e. quartz. The resulting periodic planes of expansion and contraction within the translucent material change the material's index of refraction, causing incoming light to scatter. As such, regardless of the specific configuration, beam modulator 142 induces engineered beam deflections that include, e.g., and without limitation, an angular deflection in energy beam 132 such that deflected energy beam 132 leaves beam modulator 142 along a different axis of travel than that of beam 132 as it was received by beam modulator 142.

In the exemplary embodiment, additive manufacturing system 100 is operated to fabricate component 104 from an electronic representation of the 3D geometry of component 104. The electronic representation may be produced in a computer aided design (CAD) or similar file. The CAD file of component 104 is converted into a layer-by-layer format that includes a plurality of build parameters for each layer of component 104, for example, build layer 116 of component 104. In the exemplary embodiment, component 104 is modeled in a desired orientation relative to the origin of the coordinate system used in additive manufacturing system 100. The geometry of component 104 is sliced into a stack of layers of a desired thickness, such that the geometry of each layer is an outline of the cross-section through component 104 at that particular layer location. A "toolpath" or "toolpaths" are generated across the geometry of a respective layer. The build parameters are applied along the toolpath or toolpaths to fabricate that layer of component 104 from the material used to construct component 104. The steps are repeated for each respective layer of component 104 geometry. Once the process is completed, an electronic computer build file (or files) is generated, including all of the layers. The build file is loaded into controller 106 of additive manufacturing system 100 to control the system during fabrication of each layer.

After the build file is loaded into controller 106, additive manufacturing system 100 is operated to generate component 104 by implementing the layer-by-layer manufacturing process, such as a direct metal laser melting method. The exemplary layer-by-layer additive manufacturing process does not use a pre-existing article as the precursor to the final component, rather the process produces component 104 from a raw material in a configurable form, such as a powder. For example, and without limitation, a steel component can be additively manufactured using a steel powder. Additive manufacturing system 100 enables fabrication of components, such as component 104, using a broad range of materials, for example, and without limitation, metals, ceramics, glass, and polymers.

Figure 2:
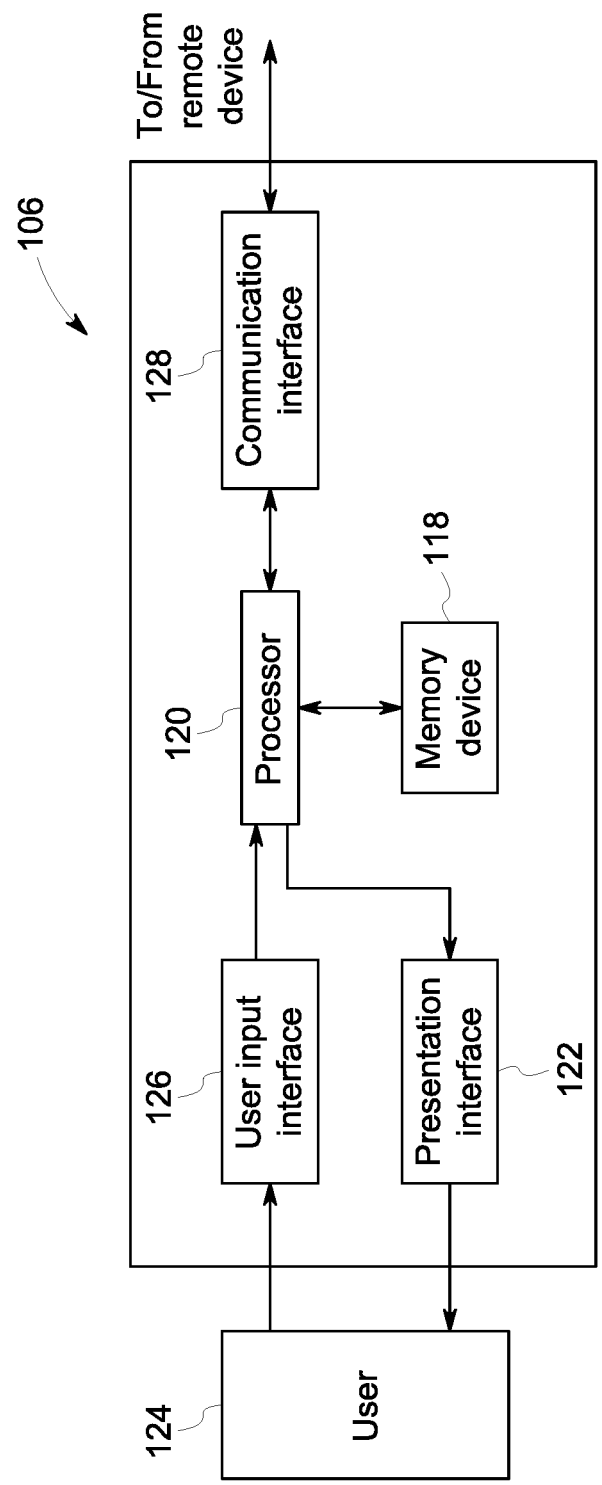
FIG. 2 is a block diagram of a controller that is used to operate the additive manufacturing system shown in FIG. 1.

FIG. 2 is a block diagram of controller 106 that is used to operate additive manufacturing system 100 (shown in FIG. 1). In the exemplary embodiment, controller 106 is one of any type of controller typically provided by a manufacturer of additive manufacturing system 100 to control operation of additive manufacturing system 100. Controller 106 executes operations to control the operation of additive manufacturing system 100 based at least partially on instructions from human operators. Controller 106 includes, for example, a 3D model of component 104 to be fabricated by additive manufacturing system 100. Operations executed by controller 106 include controlling power output of laser device 130 (shown in FIG. 1) and adjusting mounting system 108 and/or support structure 114, via actuator system 112 (all shown in FIG. 1), to control the scanning speed of laser device 130, controlling beam modulator 142 to control the induced angular deflection of energy beam 132, and controlling scanning motor 144 to direct scanning mirror 146 to further control the scanning speed of laser device 130 within additive manufacturing system 100.

In the exemplary embodiment, controller 106 includes a memory device 118 and a processor 120 coupled to memory device 118. Processor 120 may include one or more processing units, such as, without limitation, a multi-core configuration. Processor 120 is any type of processor that permits controller 106 to operate as described herein. In some embodiments, executable instructions are stored in memory device 118. Controller 106 is configurable to perform one or more operations described herein by programming processor 120. For example, processor 120 may be programmed by encoding an operation as one or more executable instructions and providing the executable instructions in memory device 118. In the exemplary embodiment, memory device 118 is one or more devices that enable storage and retrieval of information such as executable instructions or other data. Memory device 118 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 118 may be configured to store any type of data, including, without limitation, build parameters associated with component 104. In some embodiments, processor 120 removes or "purges" data from memory device 118 based on the age of the data. For example, processor 120 may overwrite previously recorded and stored data associated with a subsequent time or event. In addition, or alternatively, processor 120 may remove data that exceeds a predetermined time interval. In addition, memory device 118 includes, without limitation, sufficient data, algorithms, and commands to facilitate monitoring of build parameters and the geometric conditions of component 104 being fabricated by additive manufacturing system 100.

In the exemplary embodiment, controller 106 includes a presentation interface 122 coupled to processor 120. Presentation interface 122 presents information, such as the operating conditions of additive manufacturing system 100, to a user 124. In one embodiment, presentation interface 122 includes a display adapter (not shown) coupled to a display device (not shown), such as a cathode ray tube (CRT), a liquid crystal display (LCD), an organic LED (OLED) display, or an "electronic ink" display. In some embodiments, presentation interface 122 includes one or more display devices. In addition, or alternatively, presentation interface 122 includes an audio output device (not shown), for example, without limitation, an audio adapter or a speaker (not shown).

In the exemplary embodiment, controller 106 includes a user input interface 126. In the exemplary embodiment, user input interface 126 is coupled to processor 120 and receives input from user 124. User input interface 126 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 122 and user input interface 126.

In the exemplary embodiment, a communication interface 128 is coupled to processor 120 and is configured to be coupled in communication with one or more other devices, such as laser device 130, and to perform input and output operations with respect to such devices while performing as an input channel. For example, communication interface 128 may include, without limitation, a wired network adapter, a wireless network adapter, a mobile telecommunications adapter, a serial communication adapter, or a parallel communication adapter. Communication interface 128 may receive a data signal from or transmit a data signal to one or more remote devices. For example, in some embodiments, communication interface 128 of controller 106 may transmit/receive a data signal to/from actuator system 112.

Presentation interface 122 and communication interface 128 are both capable of providing information suitable for use with the methods described herein, such as, providing information to user 124 or processor 120. Accordingly, presentation interface 122 and communication interface 128 may be referred to as output devices. Similarly, user input interface 126 and communication interface 128 are capable of receiving information suitable for use with the methods described herein and may be referred to as input devices.

Figure 3:
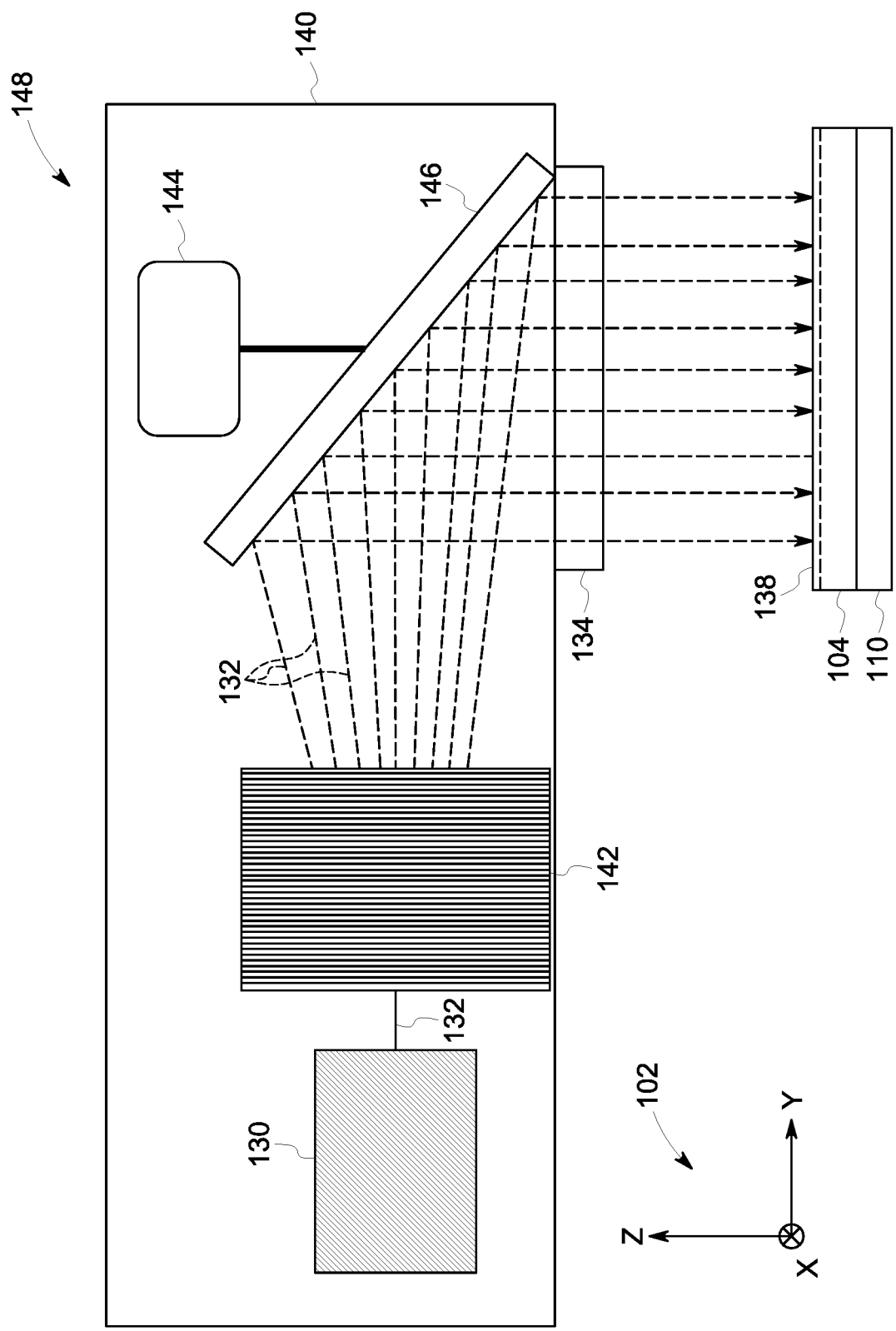
FIG. 3 is a schematic view of an exemplary powder melting device for use with the additive manufacturing system shown in FIG. 1.

FIG. 3 is a schematic view of powder melting device 148 of additive manufacturing system 100 (shown in FIG. 1). In the exemplary embodiment, powder melting device 148 includes housing 140, laser device 130, beam modulator 142, scanning motor 144, scanning mirror 146, and scanning lens 134. As discussed herein, in the exemplary embodiment, beam modulator 142 is configured to receive energy beam 132 and to induce angular deflection in energy beam 132 for intervals of time in a range from about 50 nanoseconds to about 100 nanoseconds. Alternatively, beam modulator 142 is configured to induce angular deflection in energy beam 132 for any interval of time that enables additive manufacturing system 100 to function as described herein. Each deflection of energy beam 132 is applied for a time period before beam modulator 142 switches to another predetermined angular deflection of energy beam 132 in order to simulate an array of laser devices 130, each generating an energy beam 132. After exiting beam modulator 142, each deflected energy beam 132 is illustrated as a dashed line to represent the different time periods that the energy beam is being deflected along different particular angles of deflection. Scanning mirror 146 operates to direct each deflected energy beam 132 to be incident on powder bed 110. Alternatively, scanning mirror 146 may be positioned between beam modulator 142 and laser device 130. Each deflection of energy beam 132 is configured to provide a high-intensity heat source configured to produce a beam spot incident on the surface of build layer 116 to generate at least one melt pool 138 in a powdered material, i.e., powder bed 110. The powdered material for example, without limitation, is a powdered metal.

In the exemplary embodiment, the powdered metal has a powder melting response time constant, the time constant representing the time period for which the generated melt pool will behave as a melt pool prior to transitioning to a different material state without further application of energy. In the exemplary embodiment, the powdered metal has a melting response time constant in a range from about 100 microseconds to about 1000 microseconds. To facilitate simulation of an array of laser devices 130, beam modulator 142 switches between each of the predetermined angular deflections of energy beam 132 relatively rapidly such that the melting response time constant for a melt pool under a particular beam spot incidence location is not exceeded between applications of energy beam 132. The number of beam spots that beam modulator 142 can produce incident on build layer 116, while yielding acceptable melting performance, depends on the energy generation potential of laser device 130 and the switching time of beam modulator 142. In the exemplary embodiment, for example, and without limitation, the number of beam spots that beam modulator 142 can produce incident on build layer 116, while yielding proper functioning of additive manufacturing system 100, is between 1 and 40. In alternative embodiments, beam modulator 142 generates as many beam spots incident on build layer 116 as enable operation of additive manufacturing system 100.

Figure 4:
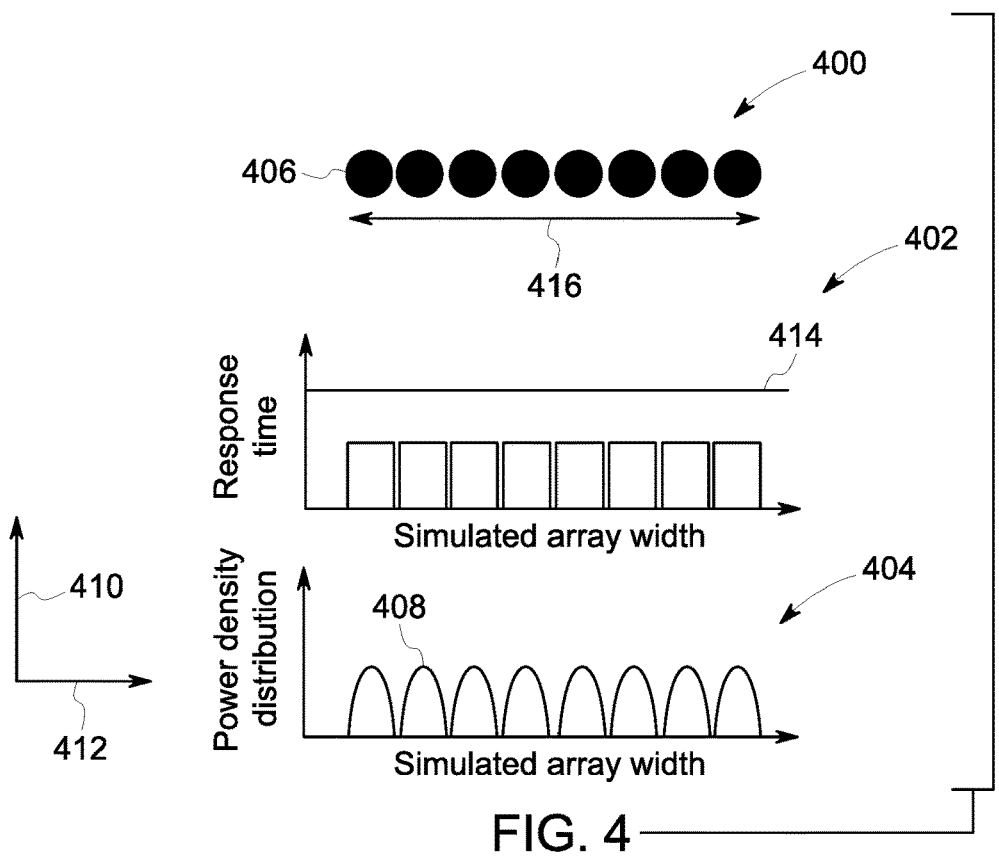
FIG. 4 is a schematic diagram of a simulated array linear beam spot pattern and a corresponding simulated array deflected beam response time and uniform power density distribution.

FIG. 4 is a schematic diagram of a simulated array linear beam spot pattern 400, a corresponding simulated array deflected beam response time 402, and a corresponding simulated array uniform power density distribution 404. Deflected beam response time 402 is shown as the amount of time between deflected beam 132 returning to incidence on a respective beam spot during operation of beam modulator 142 as a function of spatial position with respect to the x-axis (shown in FIG. 1). Power density distribution 404 is shown as incoherent irradiance (power per unit area) as a function of spatial position with respect to the x-axis (shown in FIG. 1). Referencing FIGS. 1, 3, and 4, beam spot pattern 400 is provided as a reference pattern of beam spots 406. More specifically, beam spot pattern 400 corresponds to a simulated array that would be produced by energy beam 132 with induced angular deflection of beam 132 by beam modulator 142. As indicated in power density distribution 404, each beam spot 406 generally includes a peak power intensity 408 at the center of each beam spot 406 that declines to low power at the edges of each beam spot 406.

Additionally, each beam spot 406 includes a deflected beam response time 402 that is approximately equal to every other beam spot 406 in simulated array linear beam spot pattern 400, each deflected beam response time being less than powder melting time constant 414. Accordingly, as each angularly deflected energy beam 132 of the simulated array sweeps in any combination of a first direction 410 and a second direction 412 during a manufacturing process, power is uniformly distributed between all of beam spots 406 and response time 402 is lower than powder melting time constant 414, facilitating generation of melt pool 138 within build layer 116.

Figure 5:
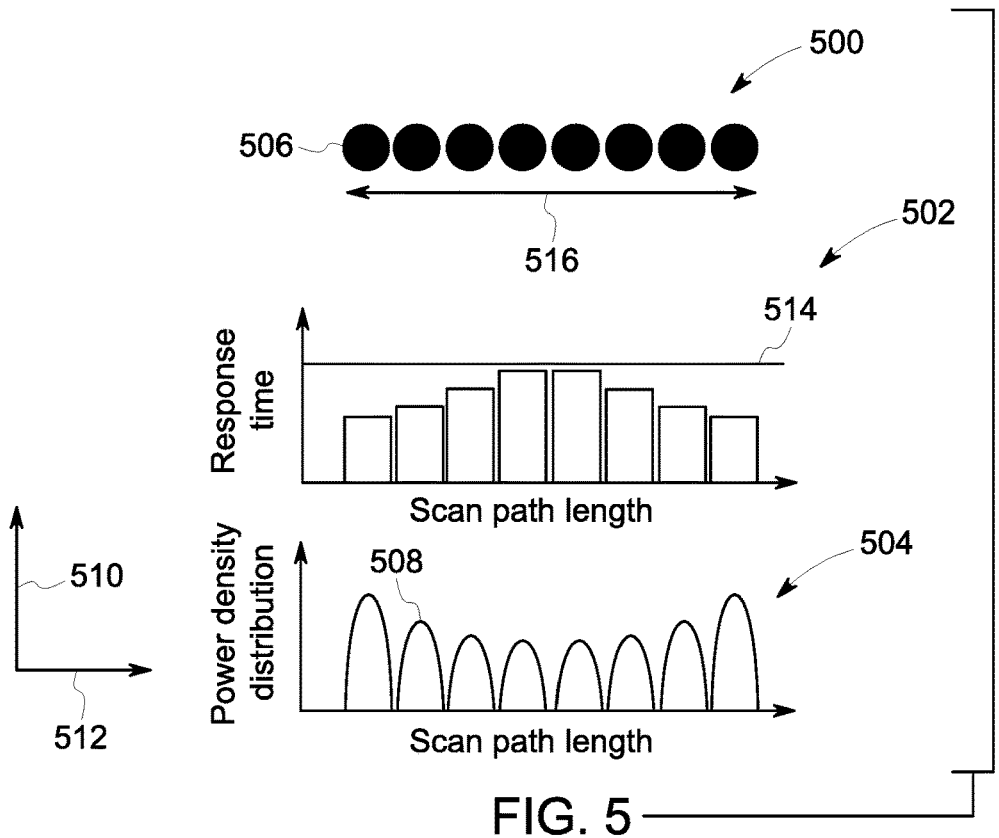
FIG. 5 is a schematic diagram of a simulated array linear beam spot pattern, a corresponding simulated array deflected beam response time, and a corresponding simulated array non-uniform power density distribution that may be produced by varying the deflected beam response time of the beam spot pattern of FIG. 4.

FIG. 5 is a schematic diagram of a simulated array linear beam spot pattern 500, a corresponding simulated array deflected beam response time 502 and a corresponding simulated array non-uniform power density distribution 504 that may be produced by varying deflected beam response time 502 in simulated array spot pattern 400 (shown in FIG. 4). Deflected beam response time 502 is shown as the amount of time between deflected beam 132 returning to incidence on a respective beam spot during operation of beam modulator 142 as a function of spatial position with respect to the x-axis (shown in FIG. 1). Power density distribution 504 is shown as incoherent irradiance (power per unit area) as a function of spatial position with respect to the x-axis (shown in FIG. 1). In contrast to the substantially similar deflection response times 402 of beam spot pattern 400 (shown in FIG. 4), beam spots 506 are subject to non-uniform power distribution facilitated by beam modulator 142 varying beam response times 502 for each of beam spots 506. For example, in certain embodiments, beam modulator 142 induces an angular deflection in energy beam 132 for a time period such that one of beam spots 506 is produced on the surface of component 104 for the time period before beam modulator 142 induces a separate angular deflection in energy beam 132 to produce another beam spot 506 on the surface of component 104 for a separate time period. As indicated in power density distribution 504, the resulting power distribution for each of beam spots 506 produces a non-uniform power distribution across a beam pattern length 516.

As indicated in power density distribution 504, each beam spot 506 generally includes a peak power intensity 508 at the center of each beam spot 506 that declines to low power at the edge of each beam spot 506. Additionally, each beam spot 506 includes a deflected beam response time 502 that, while varying from other beam spots 506, is less than powder melting time constant 514 in simulated array linear beam spot pattern 500. Accordingly, as each angularly deflected energy beam 132 of the simulated array sweeps in any combination of a first direction 510 and a second direction 512 during a manufacturing process, power is non-uniformly distributed between each of beam spots 506 and response time 502 for each beam spot 506 is lower than powder melting time constant 514, facilitating adequate generation of melt pool 138 with a non-uniform power distribution profile within build layer 116.

Figure 6:
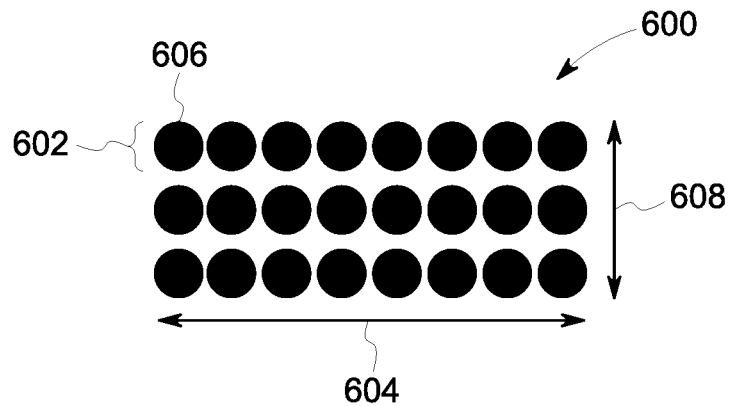
FIG. 6 is a schematic diagram of a simulated beam spot array with a uniform power distribution produced by inducing angular deflection in an energy beam for uniform time periods.

FIG. 6 is a schematic diagram of a simulated beam spot array 600 with uniform power distribution produced by inducing angular deflection in energy beam 132 for distinct time periods. Simulated beam spot array 600 is intended to illustrate a reference pattern of beam spots 606. More specifically, simulated beam spot array 600 corresponds to a simulated beam spot array produced by an additive manufacturing system having a beam modulator 142 configured to induce predetermined angular deflections in an energy beam 132 for time periods sufficient to simulate behavior of a two-dimensional laser array having uniform power distribution. Simulated beam spot array 600 generally includes a two-dimensional arrangement of beam spots 606 arranged in a plurality of beam spot rows 602 defining a beam spot array length 604 and a beam spot array width 608.

Figure 7:
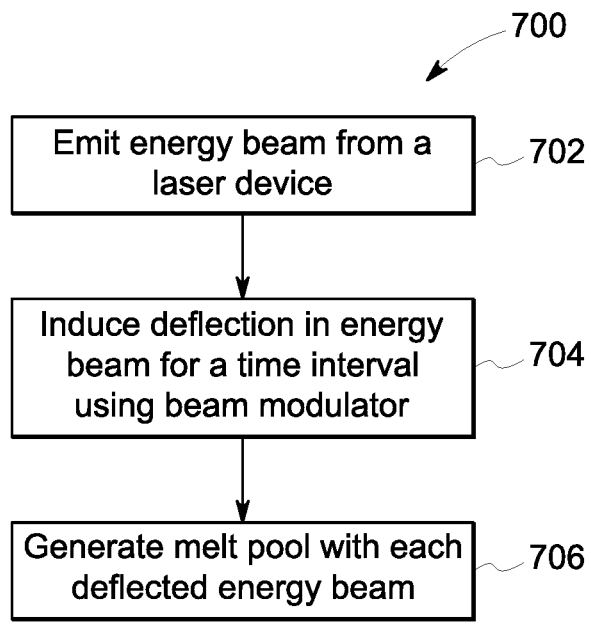
FIG. 7 is a flow chart illustrating an exemplary method for fabricating a component in a powder bed.

FIG. 7 is a flow chart illustrating an exemplary method 700 for fabricating a component 104 in a powder bed. Referring to FIGS. 3 and 7, method 700 includes emitting 702 an energy beam 132 from a laser device 130 of a powder melting device 148. Method 700 further includes inducing 704, by a beam modulator 142, a predetermined angular deflection in energy beam 132 for a predetermined time period. Beam modulator 142 is generally disposed between laser device 130 and component 104 such that as energy beam 132 travels from laser device 130 to component 104, beam modulator 142 induces an angular deflection in energy beam 132.

Powder melting device 148 and, more specifically, laser device 130 and beam modulator 142, are configured to simulate an array of laser devices 130 by inducing a plurality of predetermined angular deflections in energy beam 132, each deflection lasting for a predetermined time period. In certain embodiments, beam modulator 142 is configured to simulate a substantially linear configuration of laser devices 130 by producing a corresponding linear beam spot pattern. In alternative embodiments, beam modulator 142 is configured to simulate a two-dimensional array of laser devices 130 by producing a corresponding two-dimensional beam spot array.

The angular deflection induced by beam modulator 142 generally results in a reorientation of a beam spot corresponding to energy beam 132. For example, in the exemplary embodiment, angular deflection is induced by interference with sound waves such that the resulting beam spot is incident on a powder bed 110 in a position that differs from where the beam spot would be incident if the deflection had not occurred. In certain embodiments, beam modulator 142 includes, without limitation, at least one of an acousto-optic modulator, and electro-optic modulator, and a spatial light modulator.

Method 700 further includes generating 706 a melt pool with an angularly deflected energy beam 132. As described in more detail above in the context of FIG. 1, the angularly deflected energy beam 132 is directed to a powder bed 110 and used to selectively melt powder of powder bed 110 into melt pool 138. As melt pool 138 cools and solidifies, a portion of build layer 116 of component 104 is formed.

The embodiments described herein facilitate improved control of an energy beam produced by a laser device for use in an additive manufacturing process. More specifically, the embodiments described herein facilitate inducement of a predetermined angular deflection in the energy beam for a predetermined time period and, as a result, generation of a beam spot pattern simulating the performance of an array of laser devices. Such control facilitates tailoring the generated beam spot pattern and power density to improve the overall additive manufacturing process. For example, the systems and methods described herein can be used to simulate the behavior of an array of laser devices with only a single laser device. The systems and methods further facilitate additive manufacturing of large areas as compared to single beam spot laser systems, reducing manufacturing time and costs for a given component.

An exemplary technical effect of the methods and systems described herein includes at least one of: (a) deflecting an energy beam by an angle for a time interval; (b) simulating performance of an array of laser devices by rapidly switching between a plurality of energy beam deflections; (c) reducing manufacturing time by increasing the coverage area of a single laser device; and (d) reducing operating costs by requiring less laser devices and associated scanning hardware.

Exemplary embodiments of additive manufacturing systems including a laser device and beam modulator configured to induce a predetermined angular diffusion for a predetermined time period are described above in detail. The systems and methods described herein are not limited to the specific embodiments described, but rather, components of systems and/or steps of the methods may be utilized independently and separately from other components and/or steps described herein. For example, the methods may also be used in combination with other laser fabrication systems and methods, and are not limited to practice with only the systems and methods, as is described herein. Rather, the exemplary embodiments can be implemented and utilized in connection with many additive manufacturing system applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A powder melting device for an additive manufacturing system, said powder melting device comprising:
a laser device configured to emit an energy beam;
a beam modulator configured to selectively induce a plurality of predetermined angular deflections in the energy beam, each angular deflection maintained for an associated predetermined time period such that each predetermined angular deflection of the energy beam generates a melt pool in a powder bed, each respective associated predetermined time period being of a sufficiently short duration to facilitate the beam modulator cycling through each predetermined angular deflection prior to exceeding a melting time constant of powdered material of the powder bed, the melting time constant representing a time period for which the melt pool remains in a liquid state prior to transitioning to a different material state without further application of energy; and
a controller coupled to said laser device and said beam modulator, said controller programmed to control emissions of the energy beam from said laser device, and programmed to control said beam modulator to switch between the plurality of predetermined angular deflections and maintain each angular deflection for the associated predetermined time period, thereby creating a plurality of contemporaneous melt pools.

2. The powder melting device of claim 1, further comprising a scanning device configured to direct each predetermined angular deflection of the energy beam to be incident on the powder bed.

3. The powder melting device of claim 1, wherein said beam modulator is one of an acousto-optic modulator, a Q-switch modulator, an electro-optic modulator, and a spatial light modulator.

4. The powder melting device of claim 1, wherein the plurality of predetermined angular deflections is in a range from twenty to forty predetermined angular deflections.

5. The powder melting device of claim 1, wherein said beam modulator is further configured to produce a non-uniform energy intensity profile by varying the associated predetermined time periods.

6. The powder melting device of claim 1, wherein said beam modulator is further configured to produce a two-dimensional deflected energy beam array having a deflected energy beam array length and a deflected energy beam array width, and wherein a sum of the associated predetermined time periods is less than the melting time constant.

7. The powder melting device of claim 1, wherein each of the associated predetermined time periods is an interval of time in a range from 50 nanoseconds to 100 nanoseconds.

8. The powder melting device of claim 1, wherein said beam modulator comprises a translucent material, and wherein to control said beam modulator, said controller is configured to selectively modify an index of refraction of said translucent material.

9. An additive manufacturing system comprising:
a powder bed;
a powder melting device comprising:
a laser device configured to emit an energy beam; and
a beam modulator configured to induce a plurality of predetermined angular deflections in the energy beam, each angular deflection maintained for an associated predetermined time period such that each predetermined angular deflection of the energy beam generates a melt pool in said powder bed, each respective associated predetermined time period being of a sufficiently short duration to facilitate the beam modulator cycling through each predetermined angular deflection prior to exceeding a melting time constant of powdered material of the powder bed, the melting time constant representing a time period for which the melt pool remains in a liquid state prior to transitioning to a different material state without further application of energy; and
a controller coupled to said laser device and said beam modulator, said controller programmed to control emissions of the energy beam from said laser device, and programmed to control said beam modulator to switch between the plurality of predetermined angular deflections and maintain each angular deflection for the associated predetermined time period, thereby creating a plurality of contemporaneous melt pools.

10. The additive manufacturing system of claim 9, further comprising a scanning device configured to direct each predetermined angular deflection of the energy beam to be incident on said powder bed.

11. The additive manufacturing system of claim 9, wherein said beam modulator is one of an acousto-optic modulator, a Q-switch modulator, an electro-optic modulator, and a spatial light modulator.

12. The additive manufacturing system of claim 9, wherein the plurality of predetermined angular deflections is in a range from twenty to forty predetermined angular deflections.

13. The additive manufacturing system of claim 9, wherein said beam modulator is further configured to produce a non-uniform energy intensity profile by varying the associated predetermined time periods.

14. The additive manufacturing system of claim 9, wherein said beam modulator is further configured to produce a two-dimensional deflected energy beam array having a deflected energy beam array length and a deflected energy beam array width, and wherein a sum of the associated predetermined time periods is less than the melting time constant.

15. The additive manufacturing system of claim 9, wherein each of the associated predetermined time periods is an interval of time in a range from 50 nanoseconds to 100 nanoseconds.

* * * * *